Figure 1:
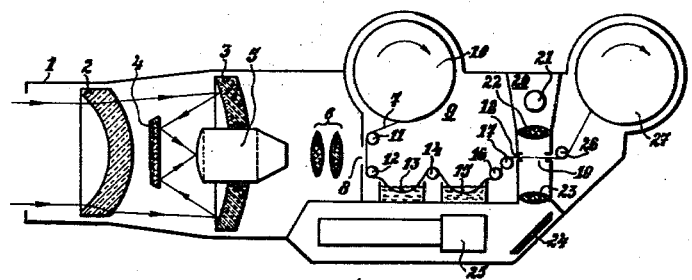

June 1, 1965   A. BOUWERS   3,187,093
ELECTRONIC AND PHOTOGRAPHIC IMAGE INTENSIFICATION
Filed Sept. 21, 1961

Albert Bouwers,
INVENTOR.
BY Wenderoth, Lind & Ponack,
Attorneys

United States Patent Office 3,187,093
Patented June 1, 1965

3,187,093
ELECTRONIC AND PHOTOGRAPHIC IMAGE INTENSIFICATION
Albert Bouwers, The Hague, Netherlands, assignor to N.V. Optische Industrie de Oude Delft, Delft, Netherlands
Filed Sept. 21, 1961, Ser. No. 139,681
Claims priority, application Netherlands, Sept. 24, 1960, 256,242; Feb. 27, 1961, 261,739
1 Claim. (Cl. 178—6.7)

The invention relates to image intensifying devices and, more particularly, to devices having an image intensifier and means including an optical objective to form a final image of the fluorescent screen of the image intensifier. One example of such a device is a television camera for working under extremely poor light conditions in which an image intensifier positioned in front of the television pick-up tube is optically coupled to the latter tube. The image intensifier which must not necessarily consist of one tube but may also comprise two or more stages which are optically coupled, intensifies an image of the scene which is being focused onto its photocathode by an optical objective, to an image of enhanced brightness appearing on the output fluorescent screen of the intensifier. This fluorescent image is then in turn imaged on the light-sensitive element of the television pick-up tube.

In the system of the present invention however, the image which is derived from the output screen and which is termed herein the final image may be formed and utilized in various manners, according to the particular application envisaged. Thus, the final image may be a virtual image or an image formed at infinity adapted to be viewed by an observer, instead of a real image.

In case the final image is real, it may be projected onto a receiving surface which may be of any type capable to produce a desired result. Thus, instead of the photocathode or target of a television camera tube, a photographic emulsion layer may be used as the receiving surface, or a ground glass or similar projection screen on which it is desired to observe the final image. All such various devices in the form of television or photographic cameras or of direct observation devices may embody my invention and are intended to be covered thereby.

Furthermore, the invention is not limited to any particular type of object nor is any particular way in which the primary image of low brightness may be formed on the photocathode of the image intensifier an essential element of the present invention. Several examples will be described hereinafter to clarify this.

Devices of the type generally referred to above have for purpose to make possible the obsevation in any form of objects of extremely low brightness and/or contrast. Typical examples of such objects are scenes at night which cannot be irradiated by artifical light sources, or the fluorescent screens of X-ray diagnostic devices. Notwithstanding the fact that during recent years the optical and image intensifier technique could be improved remarkably, in the design of devices of the type indicated one often meets with certain factors presenting limitations to further development.

Thus, it often appears very difficult to increase the brightness of the fluorescent output image of the image intensifier sufficiently to match the requirements of the envisaged application without giving up too much of image definition. In some practical cases, this means that the brightness of the object to be observed must be increased accordingly, e.g. in an X-ray installation by increasing the X-ray intensity. In cases where this would be impossible, such as in the observation of scenes at night, one has to accept the limited brightness gain as a given fact having for result that useful images can only be secured under relatively favorable conditions. If we suppose e.g. that a certain combination of a large aperture telescope objective, a one stage-image intensifier and a large aperture coupling objective for a particular scene to be transmitted by television illuminates the television pick-up tube with 0.01 lux, then the video signal derived from such an image may be practically lost in the inevitable noise of presently available television equipment. As is well-known, camera tubes of the vidicon type which, by reason of their relatively simple construction, are especially suited for some purposes envisaged here, will generally require an illumination intensity in the order of 1 lux to provide a satisfactory noise free image.

There is another and still more fundamental factor limiting the performance of existing image intensifying devices. This limitation is connected with the relatively small numbers of light quanta striking the photo cathode of the image intensifier in case the brightness of the object is very low. The number of photo-electrons which is delivered by the light quanta is still lower and may even be so small that the natural fluctuations thereof (the electron noise) may be of the same order of magnitude as the contrasts in the object whereby such contrasts become unpreceptable. It is well-known that the statistical fluctuation in a number of N elements is inversely proportional to the square root of N. The larger the number of electrons contributing to the imagery of any detail is, the smaller is the relative value of such fluctuation and the lower the contrast of the detail, relative to its background, which can be observed. The perception of low contrasts can be improved by integrating the electron or light quanta fluxes which effect the imagery during longer intervals. The integrating time of the human eye is in the order of $\frac{1}{10}$ of a second. In television pick-up tubes which store an electric charge pattern on the target during one period of the scanning mechanism, the usual integration time is approximately $\frac{1}{25}$ of a second. Hence, in both cases the integration time is relatively short and cannot easily be increased.

The invention has for its principal object to eliminate such limiting factors so as to permit the use of image intensifier devices of the type indicated above for the observation of objects of lower brightness and/or contrast than herefore possible.

In accordance with the invention the image intensifier device is characterized in that the optical objective projects an image of the fluorescent screen of the image intensifier onto a photographic film and in that the device comprises a rapidly working processing device in which the photographic film after being exposed can be processed and means including a light source to derive the said final image from the photographic film.

Thus, in the system of my present invention a photographic film is used to obtain a preliminary record of the fluorescent output image of the image intensifier. In this system very low illuminations on the film do not constitute a limitation, generally, since the exposure time may be increased accordingly. Moreover, exposure times longer than e.g. $\frac{1}{10}$ of a second mean longer integration times and, consequently, result in an improved reproduction of low contrasts. The film, upon being processed enters a viewer or projector having an independent light source illuminating the recorded picture, such that a final image is derived therefrom. The latter image may be an image seen by an observer or may be a projected image, an image on any receiving surface such as the target of a television pick-up tube, a photographic plate or a projection screen. The final image may have any desired brightness and/or dimensions so as to suit the requirements of the particular application. The viewer or projector may have suitable controls for the light intensity and the optical magnification.

The viewer or projector in the invention acts as a light relay or light amplifier in the sense that the image information which is contained in the fluorescent image and is recorded on the photographic film is transferred to any desired light intensity level and is thus made suitable for the purpose envisaged.

In the practical embodiments the invention takes advantage of some recent developments in the photographic field which have resulted on one hand in emulsions of very high sensitivity and on the other hand have made available various types of high speed processing equipment. It has e.g. been possible to produce satisfactory pictures with illuminations in the order of 0.01 lux in an exposure of 1 second. Processing times in the order of one to a few seconds have become possible.

In this system of my invention it may be of advantage to select the image size of the photographic film substantially smaller than that of a receiving surface on which the final image is formed. This can be seen as follows. Generally the image intensifying tubes applied in devices of the type under discussion, demagnify the image, i.e. the image of enhanced brightness on the fluorescent screen is substantially smaller than the primary image on the photocathode. The reason thereof is that the brightness gain which the tube is capable to give is proportional to the square of the linear demagnification. Consequently, it is desirable to select for the demagnification a value as high as is compatible with the resolving power of the fluorescent screen of the image intensifier. Thus, it is aimed at to select the dimensions of the fluorescent screen so as to combine a brightness gain which is as high as possible with an acceptable minimum number of image lines which can be resolved throughout the image.

If now the fluorescent image is to be optically projected it is desirable to avoid any magnification. Such magnification would be unsuitable since it would result in an illumination of the receiving surface which is decreased by a factor equal to the square of the magnification and such a decrease would undo part or the whole of the gain obtained through the demagnification of the image intensifier. For this reason one is sometimes forced to use an image size for the projected image which is too small to satisfy the requirements of the particular application envisaged. A typical example can be found in X-ray photography. The films on which the fluorescent image is recorded have a resolving power which is sufficient to permit the application of an imagery ratio equal to one or even to demagnify the image when photographing the image intensifier screen. In this manner one is led to use film sizes of 35 mm. or even substantially smaller the pictures of which are unsuitable, of course, to be observed with the unaided eye. The development of X-ray fluorography is pointing, however, in the opposite direction, that is towards the use of larger picture sizes which permit the direct observation. The 35 mm. format is almost completely abandoned in favour of the 70 mm. or even 100 mm. format.

The invention avoids the problem described in that it opens the possibility to increase the demagnification applied to the image intensifier, in principle, to any value that may be desired in behalf of the brightness gain, whereas nevertheless the size of the receiving surface can be chosen at will so as to suit the demands of particular applications.

Figure 2:
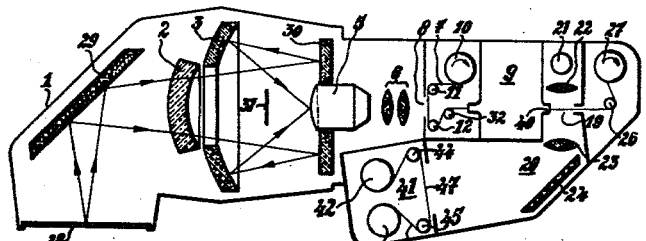
Figure 4:
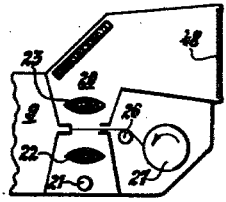
Figure 3:
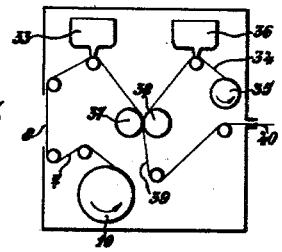
Figure 5:
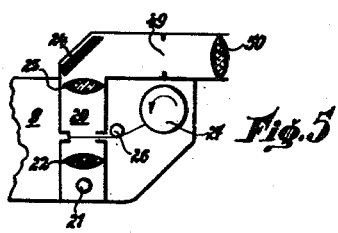

Further objects and features of the invention will be apparent from the following description of some embodiments shown in the drawing in which:

FIG. 1 is a view in axial section of a television camera for use at night constructed in accordance with the invention;

FIG. 2 a view in axial section of an X-ray image intensifier camera constructed in accordance with the invention;

FIG. 3 a sectional view of a processing unit suitable for use in devices according to the invention;

FIG. 4 a sectional view of a projector arrangement suitable for use in a device according to the invention;

FIG. 5 a sectional view of a viewing arrangement suitable for use in a device according to the invention.

Like reference numbers indicate like parts throughout the drawing.

In FIG. 1 an apparatus is shown adapted to transmit television pictures during the night or under very poor light conditions otherwise by using only the available natural light. The device contains in a housing 1 a catadioptric objective of high light gathering power which consists of the correcting lens 2, the spherical concave mirror 3 and a flat secondary mirror 4. The objective forms an image of low intensity on the photocathode of the image intensifier tube 5.

On the fluorescent screen of the tube 5 which demagnifies the image e.g. 5 times, an output image of enhanced brightness appears which, by a tandem objective 6 of high relative aperture and a magnification of one, is projected onto a photographic film 7, e.g. a 16 mm. film. The film 7 has preferably a highly sensitive emulsion, of course, but should have a sufficient resolving power to avoid a substantial loss of image details due to the granularity of the film. After the film is exposed in the image gate the exposed frame is processed in a processing unit generally designated 9 and which will be described in further detail hereinafter. The processed frames are passed through a slit 18 to the film gate 19 of a projector, generally designated 20, which further has a light source 21, a condenser 22, an objective 23 and a flat mirror 24. Mirror 24 is for deviating the light rays so as to provide a compact construction. The film frames are projected onto the light sensitive layer of a television pick-up tube 25, such as a vidicon or an image-orthicon, at a magnification which is determined by the size of the light-sensitive layer. The illumination on this layer is dependent on the intensity of the light source 21 and the diaphragm of the projection objective 29 and can easily be controlled to such a value that the inherent noise of the tube 42 is of no interest.

It will be understood that the invention provides the possibility to work under conditions which are much more difficult than was possible with direct optical coupling of the output screen of the image intensifier to the television pick-up tube. An illumination insufficient to result in satisfactory video signals is still capable to produce a sufficiently dense photographic picture, provided that the exposure time is adequately adapted to the available illumination. Alternatively, the invention permits the use of less powerful elements in the chain consisting of the front objective, the image intensifier and the lens 6, which elements may be smaller and less expensive and may facilitate the handling of the camera.

To illustrate the possibilities of the invention it may be observed that in a certain practical apparatus satisfactory images can be obtained on the film 7 of scenes having a back-ground brightness as low as $10^{-5}$ asb (corresponding to $\frac{1}{10,000}$ of the horizon brightness at full moon) in an exposure of 1 second. The object to be observed must of course permit such relatively long exposure times which is the case if the object does not move or moves only slowly through the field of view such as ships at large distances. The highest picture frequency which, under given conditions, may be attained with the apparatus of FIG. 1 depends on the required exposure time and on the manner in which the film is processed.

The film should of course be fed through the processing unit 9 in such a way that the effective development time is substantially equal for all frames. In the apparatus of FIG. 1 it is supposed that a certain constant length of the film 7 is periodically unwound from the supply spool 10.

The film 7 first passes the image gate 8, is then drawn through a developing tank 13 and a fixing tank 15 and is guided to follow the required curved path by rollers 11, 12, 14, 16 and 17 and other guiding members which are not shown in the drawing for simplicity. The length of film fed at each step corresponds to the height of the image plus the spacing between successive pictures which is necessary to cover the distance between the image gate 8 and the developing tank 13. The exposed picture frame thus will be immersed into the developing agent in tank 13 and will remain therein for the same time as it has been in the image gate 8. This time interval apparently determines also the maximum exposure time possible in this system. Shorter exposure times can be established, of course, e.g. by means of a shutter (not shown) incorporated in the objective 6 or by switching off the image intensifier after a sufficient exposure. When the film makes the next step the picture frame just developed enters the fixing bath 15 whereas the preceding frame will be positioned in the image gate 19 of the projector. Hence, fixing and projection are of equal duration as the development. The picture frames become available for projection after two waiting intervals and are then transmitted by television during one interval each, e.g. to a distant monitor. Such intervals may have a duration of e.g. ½ to 2 seconds. In the example the film may still be wet and get lost when it is wound on the take-up spool 27 via guiding roller 26.

It will be understood, meanwhile, that the details of the film feeding and processing arrangements form no part of the present invention proper and may be varied in numerous ways in accordance with techniques now well-known in the photographic art. For instance, in the above described application where exposures are made at fixed intervals in a not too low frequency, a continuous film speed may be maintained in the processing baths in combination with an intermittent film movement past the image gates 8 and 19 of the objective 6 and the projector 20, respectively. Alternatively, a completely continuous film movement may be maintained if conventional optical means are used to compensate for the film motion during the exposure and the projection.

In the housing 1 of the X-ray image intensifier camera shown in FIG. 2 a catadioptric objective is mounted to form an image of the fluorescent screen 28 on the photocathode of the image intensifier tube 5. The objective consists of a flat oblique mirror 29, a corrector lens 2, a perforated concave mirror 3, a perforated flat mirror 30 and an opaque baffle 31. The oblique mirror 29 deviates the optical axis 90° so that the fluorescent screen 28 which forms a light-tight closure of the camera housing is parallel to the camera axis. The catadioptric system shown is well-known per se and will not be described in detail. The paths of a pair of light rays emitted by the center of the fluorescent screen may be seen in the drawing. In addition to cameras of the type shown in which an optical system is used to couple the fluorescent screen and the image intensifier, the invention is likewise applicable to cameras having their fluorescent screen arranged within the intensifier tube in direct contact with the photocathode.

On the anode screen of the image intensifier 5 an image appears which is demagnified e.g. in a ratio of 4 to 1 and whose brightness is increased in comparison to the photocathode image. An image of the anode screen is formed on a small size film 7 by means of a symmetrical objective 6 having a magnification one.

The film 7 is unwound from a supply spool 10 and guided via a roller 11 to the image gate 8. After the exposure the film is guided over rollers 12 and 32 to a rapidly working processing unit generally designated 9. In FIG. 3 a possible form of the processing device is shown separately.

A very thin layer of a suitable developing agent of high viscosity is applied to the emulsion side of the film 7 by a slit shaped ejection aperture in a container 33. At the same time a transparent plastic film 34 having a width corresponding to the image size is unwound from a supply spool 35 and provided with a thin layer of fixing agent from the container 36. Then the two films are drawn between a pair of rollers 37 and 38 such that their wetted surfaces are pressed together to form a sandwich-film 39. Development and fixing partly take place simultaneously and proceed very rapidly. The sandwich-film 39 leaves the processing unit through a light-tight slit 40 and enters the image gate 19 of a projector device 20 which in this case takes the form of a photographic copier. The device comprises a light source 21, a condenser lens 22, a projector lens 23, an oblique mirror 24 and a film magazine 41. Film magazine 41 contains a supply spool 42, a take-up spool 43 and two guiding rollers 44 and 45 via which a film 46 is positioned in the image gate 47. Film 46 is of a size substantially larger than the original film and the magnifaction of the copying projector 20 may be such that the pictures on film 46 after development etc. can be evaluated with the unaided eye. As an example, film 7 may be a 35 mm. film, film 46 a 100 mm. film and the magnification of the copying projector may be 4 times. Film magazine 41 may be provided with means to sever an exposed length of film such that the take-up spool 43 with the exposed part of the film can be taken out in order to be processed. Alternatively, magazine 41 may be arranged for one cut film or a supply of cut films which may be exposed and developed individually.

The sandwich-film 38 leaves the copying unit through a slit and is guided by roller 26 to the take-up spool 27. If the camera of FIG. 2 is required to take pictures at irregular or long intervals a suitable way to feed the film consists in drawing the exposed frame of film 7 after each exposure at a constant speed through the processing unit 9 until it arrives at the image gate of the copying projector 20. In that case only a relatively small fraction of the film, of course, will be exposed but this is not very inconvenient as the film 7 is of a small size and relatively inexpensive. It is an advantage, on the other hand, that each picture is presented for copying a well-defined short time after the exposure.

Alternatively, pictures taken at irregular intervals may be combined to a series of predetermined length by feeding the film past the image gate, after each exposure, a distance corresponding to one image. In this way a film loop may gradually be formed between the image gate 8 and the processing unit 9. Upon completion of the last exposure of the series an additional length of the film 7 may be drawn past the image gate without further exposure such that, when the film loop is subsequently passed through the processing and copying unit at the required speed the last exposed picture frame just appears in the image gate 19 of the copying projector 20. In this way a greater film economy may be attained.

It will be seen that in case high speed processing equipment is used there will be hardly any difference, from the point of view of the camera user, between the camera described with reference to FIG. 2 and the conventional X-ray fluorographic camera. Both of them deliver exposed films of the large format which, if desired, may be taken out of the camera practically immediately after exposure in order to be processed in the conventional manner. Alternatively, the camera of the invention may be provided, however, with a further processing unit adapted to automatically process the larger size film too before it is taken out.

FIG. 4 illustrates that the television pick-up tube 25 of FIG. 1 and the photographic film 46 of FIG. 2 may be substituted by a projection screen 48, whereby the devices of FIGS. 1 and 2 are converted into a night telescope and an X-ray fluoroscope, respectively. If compared with conventional instruments having a magnifying glass or a microscope for directly observing the fluorescent screen of the image intensifier, the device according to the invention which is equipped with a projector as shown in FIG. 4 has the following advantages. As the exposure time of the film in many applications can be made longer than the storing time of the average eye lower object brightnesses and contrasts can be percepted. In addition, adaptation of the eye is unnecessary since the brightness of the projected image can be set at any desired value. The position of the eye relative to the instrument is not critical and many persons may observe the projected image simultaneously.

In FIG. 5 there is shown a magnifying viewer for observing the pictures on the film 7 which viewer comprises, in addition to the light source 21 and the condenser lens 22, an objective 23 and an eye piece 50. The objective 23 forms an image of the picture frame in the focal plane of the eye piece 50. It will be understood that any other type of magnifying means such as a single lens may be used for the purpose of enlarged viewing. However, if a complex viewing instrument as shown in FIG. 5 is substituted for the television pick-up tube of FIG. 1, a night telescope is obtained which can be used as a sighting instrument. Therefore, the axis of the eye piece 50 will preferably be made parallel to the optical axis of the objective 2-4 in front of the image intensifier.

For simplicity's sake, in the foregoing description a number of components of the devices shown have not been referred to in detail though they may contribute to a good functioning of the apparatus, since they will readily present themselves to those skilled in the art. For example, in FIG. 2 the objective 23 may be provided with a suitable shutter to permit a precise exposure of the film 46. In the processing unit several modern techniques not described here but well-known in the art may be applied, such as the spraying of processing liquids, monobath processing, silver salt diffusion techniques, etc. Furthermore, certain non-chemical photographic techniques, such as xerography, appear quite suitable for application in the system according to the invention.

What I claim is:

In an image forming device the combination of a first optical objective, an image intensifier having a photo-emissive screen in the focal surface of said first optical objective, a luminescent screen, and electron-optical means to reproduce an image on said photo-emissive screen on said luminescent screen, a second optical objective arranged to project an image of said luminescent screen onto an exposure window, a photographic film in said exposure window, means to develop latent images on said photographic film, a projection window, means to transfer said photographic film to said projection window, a light source associated with said projection window, and a third optical objective arranged to project a real image of said film when in said projection window onto a receiving surface, said image intensifier reproducing said image with a substantial demagnification on said luminescent screen, said second and third optical objectives being arranged so as to work as a magnification of substantially unity and a magnification substantially exceeding unity, respectively.

References Cited by the Examiner

UNITED STATES PATENTS

| 2,275,898 | 3/42 | Goldsmith | 178—7.4 |
| 2,586,392 | 2/52 | Sheldon | 250—65 |
| 2,595,430 | 5/52 | Tuttle | 250—65 |
| 2,898,467 | 8/59 | Von Ardenne | 346—10 |
| 2,996,573 | 8/61 | Barnes | 178—6.6 |

FOREIGN PATENTS 22,637  3/29  Australia.

OTHER REFERENCES

British Communications and Electronics, "Photo-Projection of C.R. Displays," April 1958, page 257.

DAVID G. REDINBAUGH, *Primary Examiner.*

JOHN P. WILDMAN, *Examiner.*